US 6,696,947 B1

(12) United States Patent
Bybee

(10) Patent No.: US 6,696,947 B1
(45) Date of Patent: Feb. 24, 2004

(54) METAL DETECTOR

(75) Inventor: Mark T. Bybee, Port Richey, FL (US)

(73) Assignee: Xtreme Research Corporation, Port Richy, FL (US)

( * ) Notice: Subject to any disclaimer, the term of this patent is extended or adjusted under 35 U.S.C. 154(b) by 10 days.

(21) Appl. No.: 10/199,880

(22) Filed: Jul. 19, 2002

(51) Int. Cl.$^7$ .............................................. G08B 13/24
(52) U.S. Cl. ................. 340/551; 340/572.1; 340/572.7; 340/693.5; 324/259; 361/725; 361/732
(58) Field of Search ................................. 340/551, 552, 340/572.1, 572.5, 572.6, 572.4, 693.5, 643.9, 572.8, 572.7; 324/260, 259, 228; 224/101; 361/725, 726, 732, 733

(56) References Cited

U.S. PATENT DOCUMENTS

| | | | | |
|---|---|---|---|---|
| 220,429 A | | 10/1879 | Russell ............................ 52/70 |
| 668,748 A | | 2/1901 | Buchanan .................... 312/200 |
| 3,341,987 A | | 9/1967 | Johansson ....................... 52/70 |
| 3,950,696 A | * | 4/1976 | Miller et al. ................. 324/234 |
| 4,012,690 A | | 3/1977 | Heytow ....................... 324/243 |
| 4,486,712 A | * | 12/1984 | Weber ........................ 324/329 |
| 4,641,091 A | * | 2/1987 | Cone .......................... 324/202 |
| 4,779,777 A | * | 10/1988 | Johnson et al. ............. 224/250 |
| 4,797,618 A | * | 1/1989 | De Vries .................... 324/326 |
| 4,866,424 A | | 9/1989 | Parks .......................... 340/551 |
| 4,883,443 A | | 11/1989 | Chase .......................... 446/478 |
| 4,906,973 A | | 3/1990 | Karbowski et al. ......... 340/551 |
| 4,959,636 A | * | 9/1990 | Maher ........................ 324/327 |
| 5,132,156 A | | 7/1992 | Trassare, Jr. et al. ........ 428/116 |
| 5,576,621 A | * | 11/1996 | Clements .................... 324/239 |
| 5,970,694 A | * | 10/1999 | Knox, Jr. ..................... 56/16.7 |
| 6,037,870 A | * | 3/2000 | Alessandro ............. 340/572.1 |
| 6,041,940 A | * | 3/2000 | Owings ........................ 209/44 |
| 6,133,829 A | * | 10/2000 | Johnstone et al. .......... 340/551 |
| 6,222,450 B1 | * | 4/2001 | Clements ................. 340/568.1 |
| 6,366,203 B1 | * | 4/2002 | Burns ........................ 340/551 |

\* cited by examiner

Primary Examiner—Benjamin C. Lee
(74) Attorney, Agent, or Firm—David W. Pettis, Jr., PA

(57) ABSTRACT

An improved metal detector characterized by enclosing the detector's circuitry in a foldable enclosure whereby the improved detector may be transported easily and quickly and securely erected for use.

11 Claims, 11 Drawing Sheets

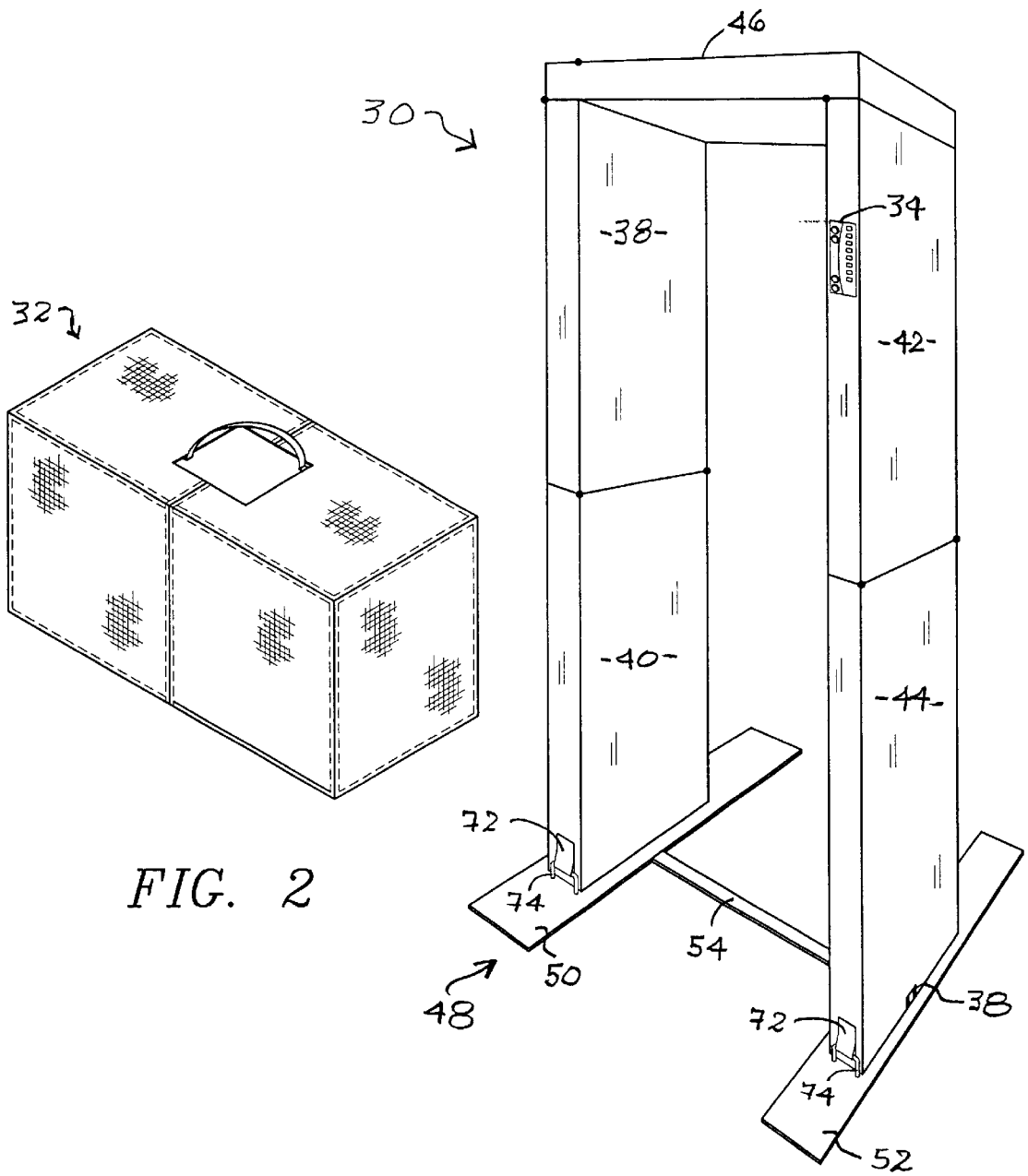

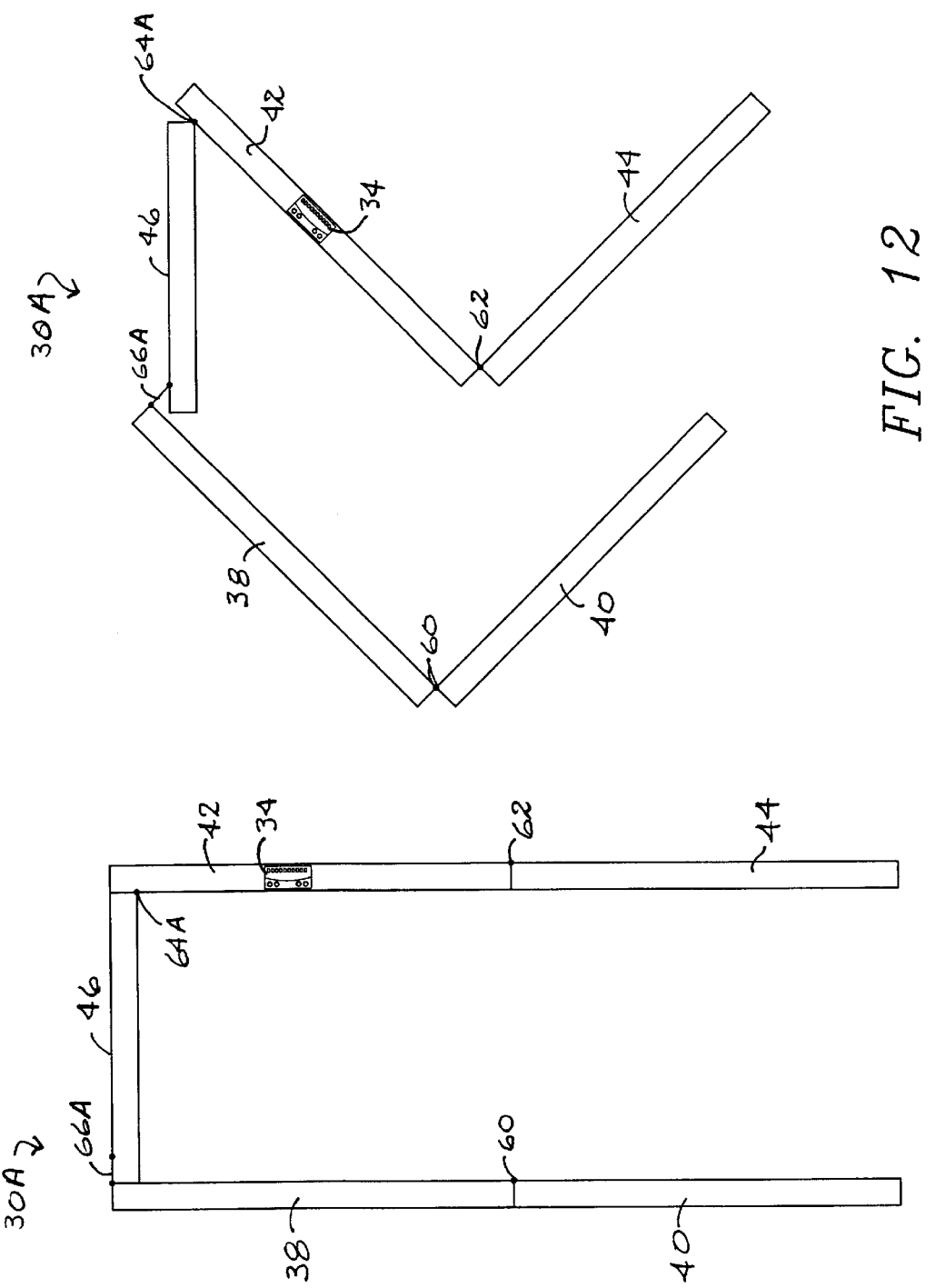

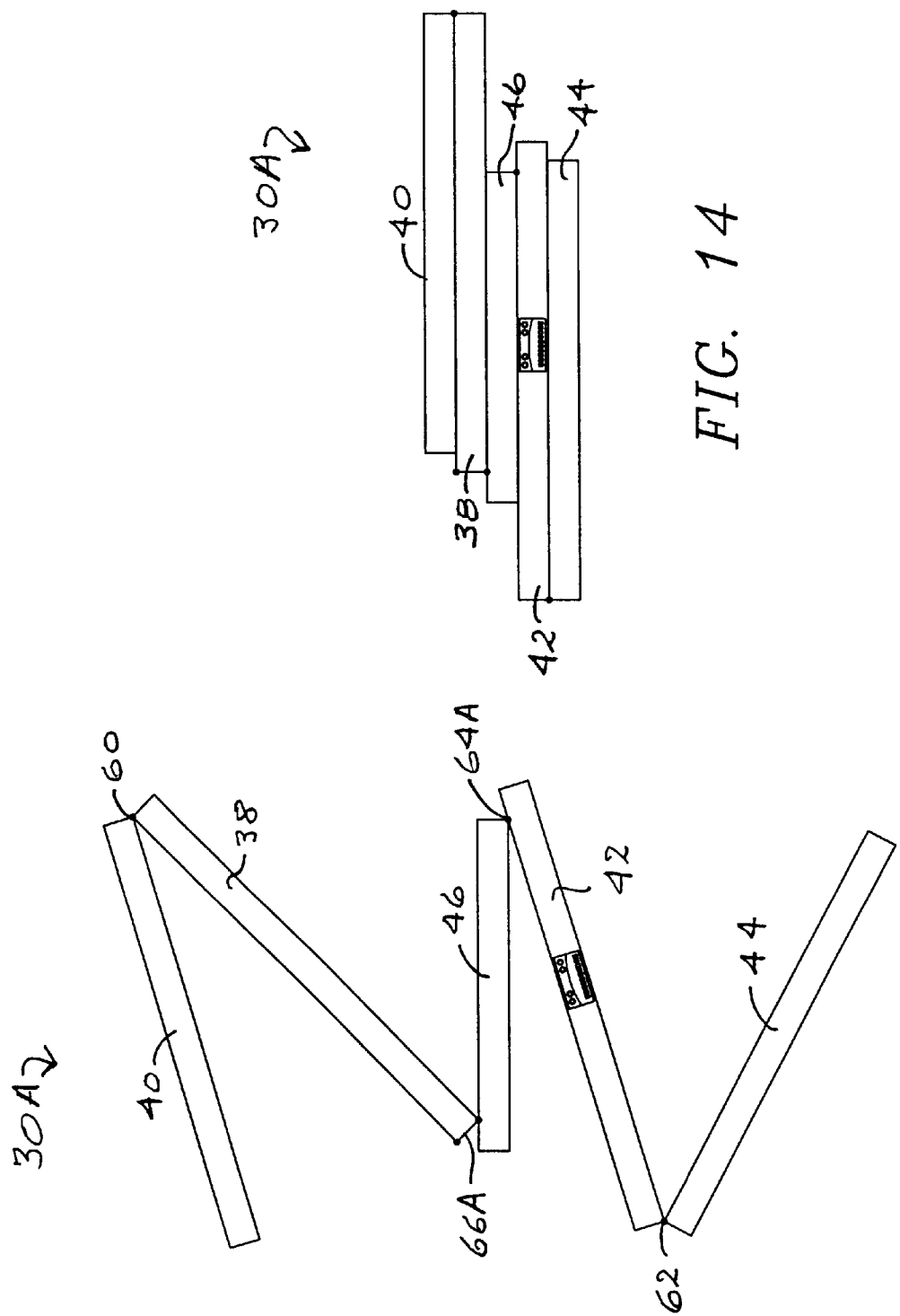

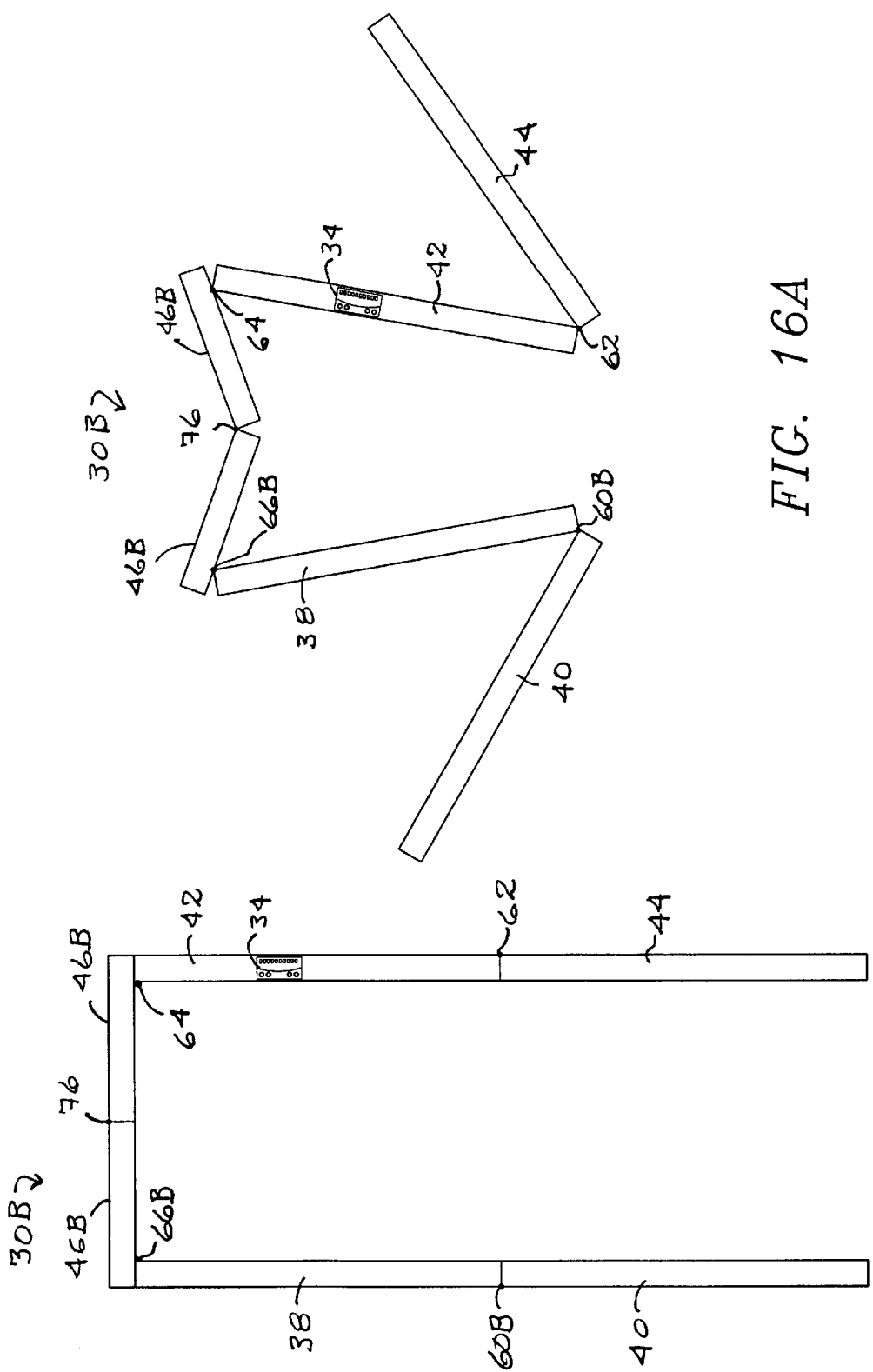

METAL DETECTOR

BACKGROUND OF INVENTION

1. Field of the Invention

The present invention relates to an improvement of metal detectors such as those typically found in office buildings and airports. Such metal detectors are the type where persons and objects pass through a magnetic field created by circuitry in the detector whereby the presence of metal may be determined. Most such metal detectors are based on pulse induction technology, and while the improvement of this invention may be used with virtually any type of walkthrough metal detector, it is believed that the improvement will be utilized primarily in combination with pulse induction detectors.

2. Description of the Prior Art

As indicated above, walkthrough metal detectors are quite old and well known in the art. Obviously, at this point in our country's history, the importance of metal detectors has perhaps never been greater. While such metal detectors have been known and used for many years in facilities such as airports and government buildings, use of walkthrough metal detectors has recently been expanded to a wide variety of public facilities, including, for example, office buildings and public schools.

With regard to current state-of-the-art walkthrough metal detectors, they are typically a relatively permanent installation. That is to say, the device comprises an inverted U-shaped configuration that is erected and installed in a substantially permanent manner at the entry point where persons and objects are to be screened.

It is therefore apparent that there is a need in the art for an improved metal detector capable of relatively easy disassembly, transportation, and re-assembly for use at a different location. Such an improved metal detector must be of relatively light weight, preferably capable of being carried by one person. Of course, such an improved metal detector must also provide for ease of re-assembly without damage to the detector's circuitry, so that the reliability of its use is not compromised.

It was with these and other goals in mind that the present invention was developed.

SUMMARY OF THE INVENTION

The present invention comprises an improvement in metal detectors of the type where persons and objects pass through a magnetic field created by circuitry in the detector whereby the presence of metal may be determined. The improvement comprises a foldable enclosure for the detector's circuitry, that foldable enclosure comprising a plurality of detector panels and means for connecting each one of the panels to at least one other of the panels, whereby the foldable enclosure may be erected to define a substantially inverted U-shaped configuration having a closed top, opposing legs extending downwardly from the top, and an open bottom defined by the space between the legs. The improvement further comprises a base dimensioned and configured to receive the erected enclosure, whereby the metal detector may be erected and secured in an operative position.

It is to be understood that the scope of this invention is not intended to be limited to any particular circuitry or control devices for the metal detector, though in preferred embodiments described hereinafter, some of these elements will be discussed for purposes of providing a full and complete disclosure of the improvement of this invention.

The invention accordingly comprises an article of manufacture possessing the features, properties and the relation of elements which will be exemplified in the articles hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a perspective view of a first preferred embodiment for the foldable closure comprising the improved metal detector of this invention.

FIG. 2 is a perspective view of the embodiment of FIG. 1, folded and placed inside a carrying case.

FIG. 11 is a front elevation of a second embodiment of the foldable enclosure.

FIG. 12 is a partially folded view of the second embodiment shown in FIG. 11.

FIG. 13 is a further folded view of the embodiment of FIG. 11.

FIG. 14 is a completely folded view of the embodiment of FIG. 11.

FIG. 15A is a third embodiment of the improvement of this invention.

FIG. 16A is a partially folded view of the embodiment shown in FIG. 15A.

Similar reference characters refer to similar parts throughout the several views of the drawings.

DETAILED DESCRIPTION OF THE INVENTION

Figures 3, 4:
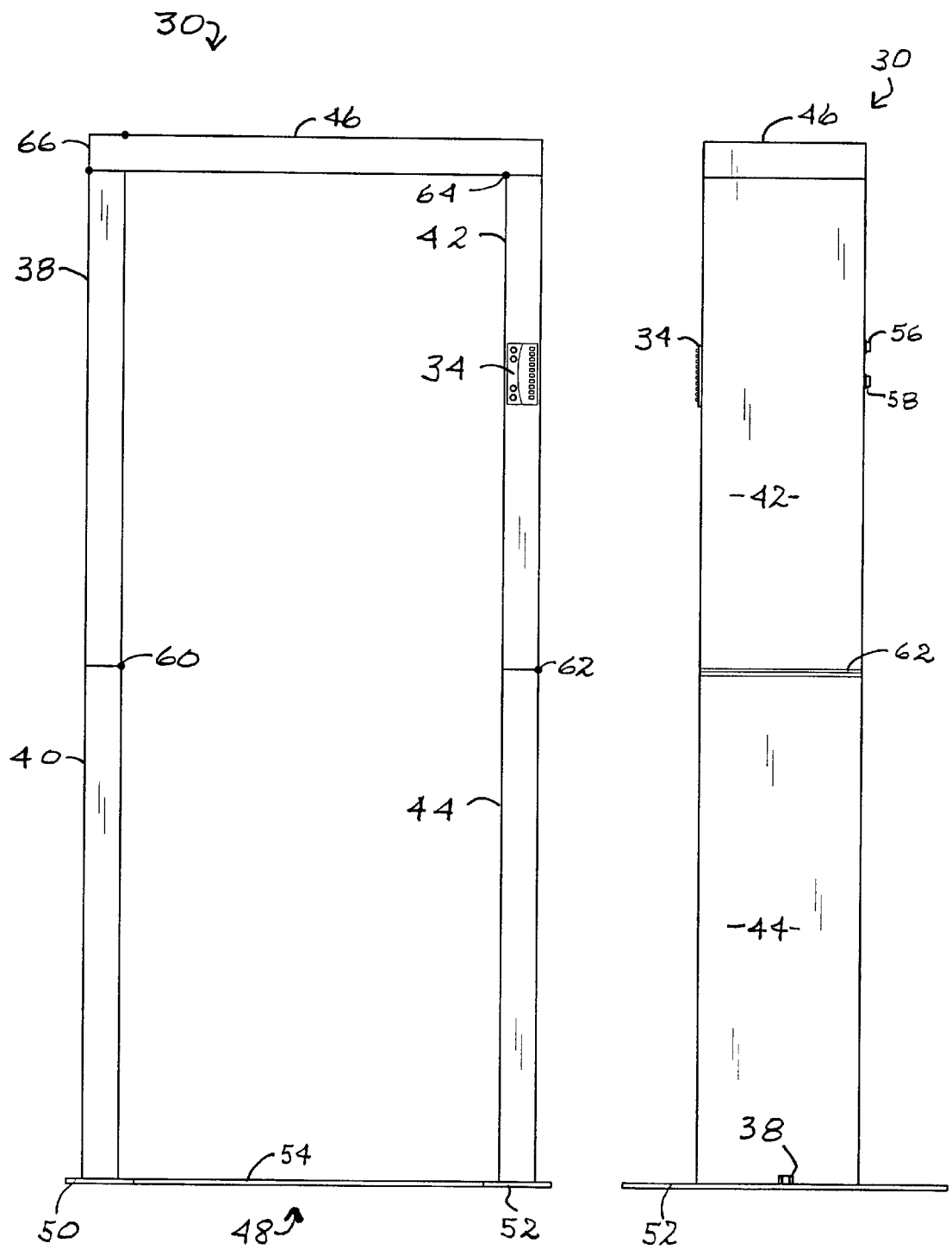
FIG. 3 is rear elevation of the first preferred embodiment shown in the view of FIG. 1.
FIG. 4 is a side elevation of the embodiment of FIG. 1.
Figure 6:
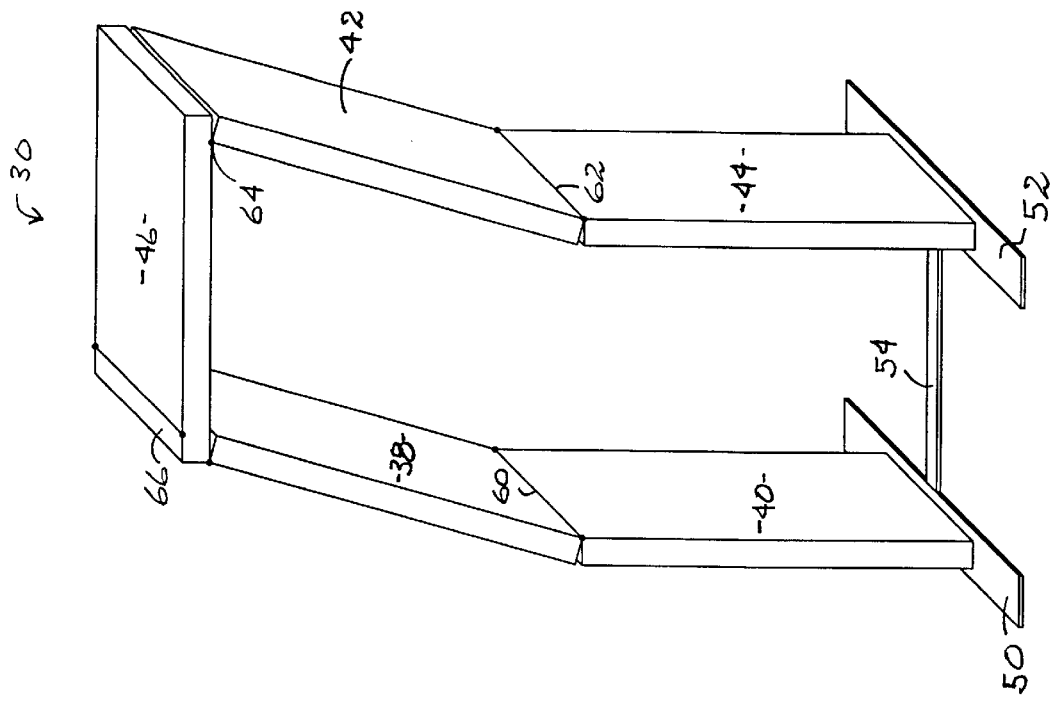
FIG. 6 is a partially folded view of the embodiment as shown in FIG. 5.
Figure 5:
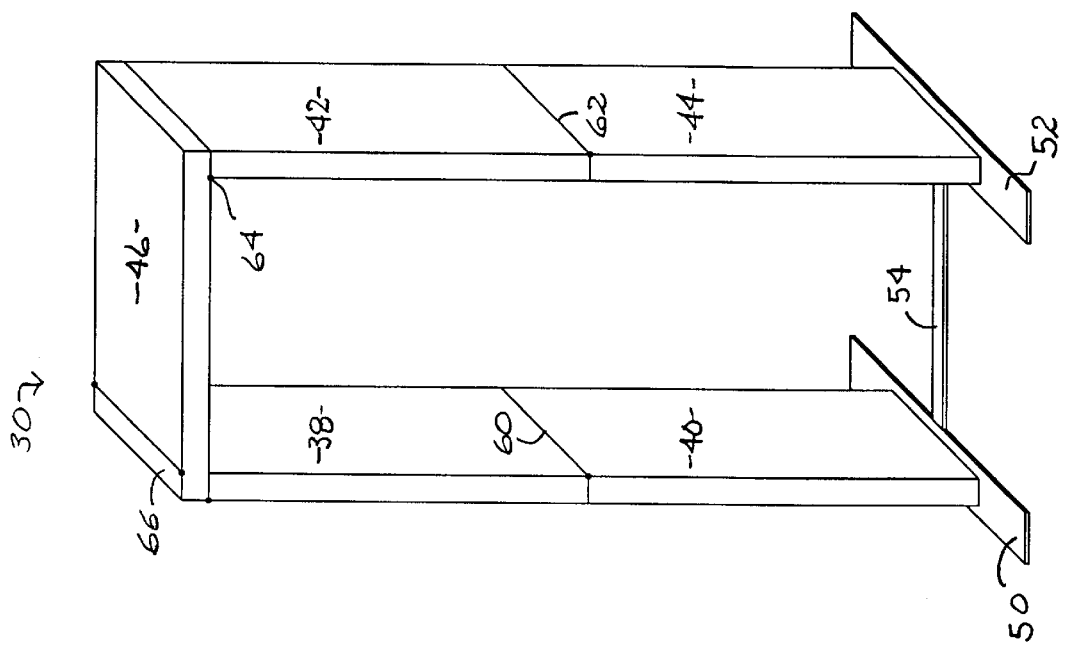
FIG. 5 is a simplified perspective view of the embodiment of FIG. 1, illustrating the folding planes.

The present invention relates to an improvement in walkthrough metal detectors comprising a foldable enclosure for the detector's circuitry, and a first preferred embodiment for the improved foldable enclosure is generally indicated as 30 in the view of FIG. 1. That same first embodiment 30 is shown in its folded condition inside a carrying case generally indicated 32 in the view FIG. 2. Because the present invention relates to an improvement in the nature of a foldable enclosure for the metal detector's circuitry, it is to be understood that the circuitry and other elements of a walkthrough metal detector are not claimed as elements of this invention and that the improved foldable enclosure is intended for use in combination with and as an improvement to virtually any such metal detector. Nevertheless, certain elements of the metal detector will be identified and discussed in order to more fully set forth the nature of the present invention.

For example, as shown in the view of FIG. 1 and other ones of the drawings, provision is made for the location and placement of a detector control panel 34, whereby persons responsible for actually operating and monitoring the metal detector may make necessary settings and adjustments. In similar fashion, an outlet 36, also visible in the view of FIG. 1, is provided whereby the detector's circuitry may be operatively connected to a power source.

Operation of such walkthrough metal detectors, and the circuitry necessary for their proper performance, are well known in the art and basically comprise coils, orwires, which generate a magnetic field through which persons and/or objects pass. If metal passes through the field, the field is disturbed and visual and/or audible signals are created. These coils or wires are operatively disposed within foldable enclosure 30 and may be surrounded with, for example, high density polyurethane. In all embodiments shown, the actual metal detector utilizes quad coil detection fields and state-of-the-art digital microprocessors.

It is also to be understood that in state-of-the-art metal detectors such as those for which this invention is an improvement typically include a protective core surrounding the circuitry within the side panels. Frequently, this protective core takes the form of one or more sheets of polyurethane foam which may actually include pockets or receptacles for the circuitry. All embodiments of this invention would include such a protective core, though not shown in the drawing figures. It is further contemplated that all embodiments of the improvement of this invention would include means for accessing the circuitry within the side panels for known purposes of repair, maintenance and modification.

Referring now to the first preferred embodiment of FIG. 1 for the foldable enclosure 30, one can see that foldable enclosure 30 comprises side panels 38, 40, 42 and 44, and a top panel 46. Side panels 38, 40, 42 and 44 include detector coils operatively mounted therein, and top panel 46 is for structural integrity of the foldable enclosure 30. Disposed in receiving relation to the distal ends of side panels 40 and 44 is a base, generally indicated as 48. In the preferred embodiment for base 48, a substantially H-shaped configuration is provided and the distal ends of side panels 40 and 44 each rest on a respective one of the base sides, 50 and 52. Crossbar 54 extends an interconnecting relation between sides 50 and 52. Though not shown in all drawing figures, each of the further preferred embodiments shown in the drawing figures and described in greater detail below do include a corresponding base 48.

Referring to the view of FIG. 4, one can see that the side of side panel 42 opposite that from which detector control panel 34 is mounted, includes a pair of display lights 56 and 58. According to known metal detector devices, lights 56 and 58 provide a visual indication to a person preparing to pass through the detector as to whether or not the detector is "ready," and light 56 is typically red while light 58 is typically green.

Referring now to the views of FIGS. 5–9, one may see in the series of drawings how the invention of first embodiment 30 is actually folded for placement inside carrying case 32. Attention is invited to the fact that base 48 is not shown in the views FIGS. 7–9. One can clearly see the various fold lines as designated at 60, 62 and 64. The effective "hinges" at fold lines 60,62 and 64 preferably comprise a flexible material interconnecting side panels 38 and 40, 44 and 42, and 42 and 46, respectively. With particular regard to fold lines 60 and 62, circuitry for the detector coils operatively disposed in panels 38, 40, 42 and 44 include flexible connectors within fold line 60 and fold line 62.

Figure 8:
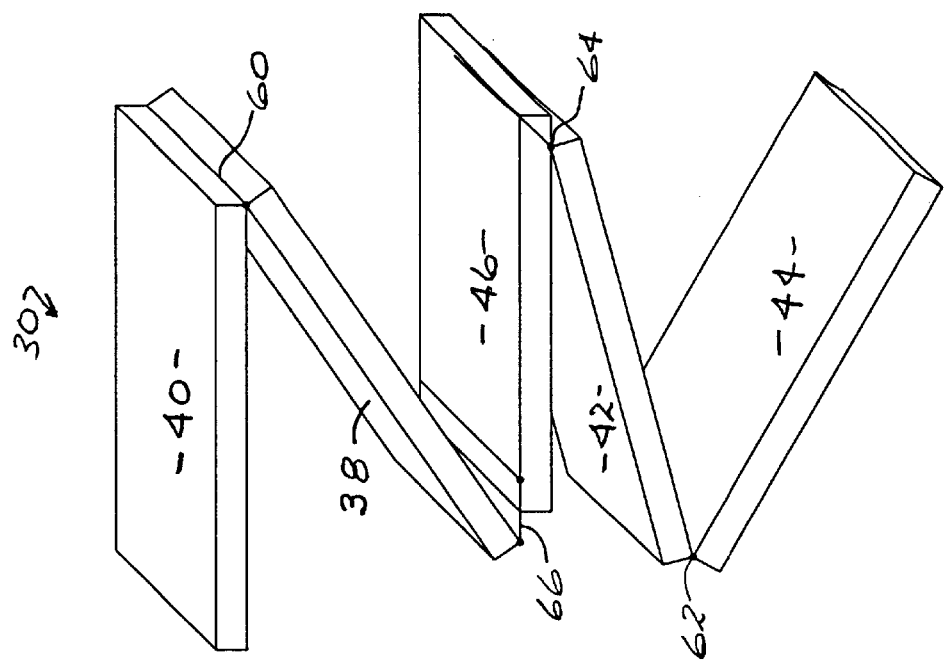
FIG. 8 is a further view of the embodiment of FIG. 5, showing still further folding.
Figure 7:
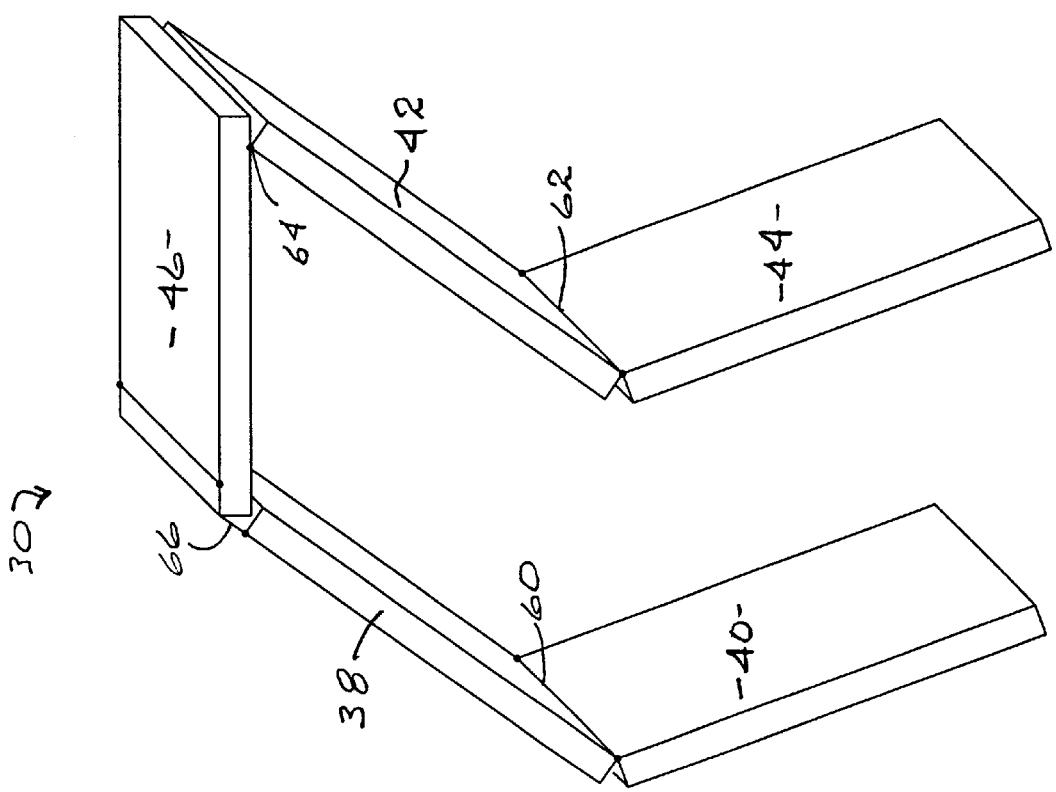
FIG. 7 is a view similar to that of FIG. 6, showing further folding of this embodiment.
Figure 9:
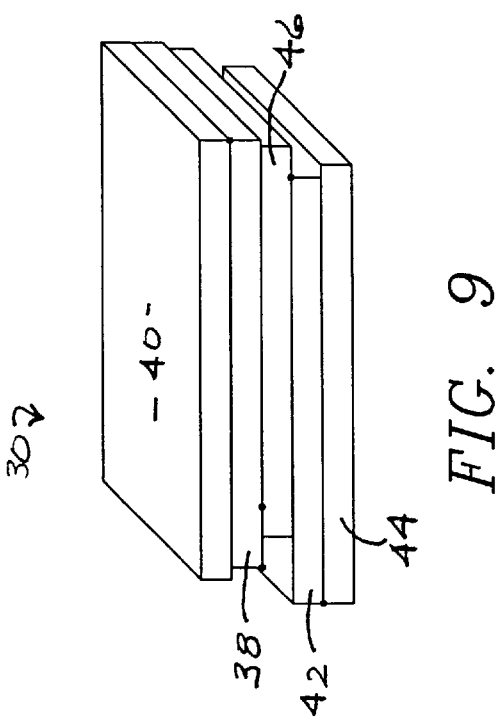
FIG. 9 is a folded view of the embodiment shown in FIG. 5.

Owing to the construction of this first embodiment 30, the folding connecting between side panel 38 and top panel 46 is preferably defined by a segment of flexible material 66 so that side panel 38 can be folded over top panel 46 as shown in the views of FIGS. 8 and 9. Flexible connectors for the detector coils also pass through fold line 64 and the segment of flexible material 66 in order to complete the detector's electrical circuitry.

Figure 10:
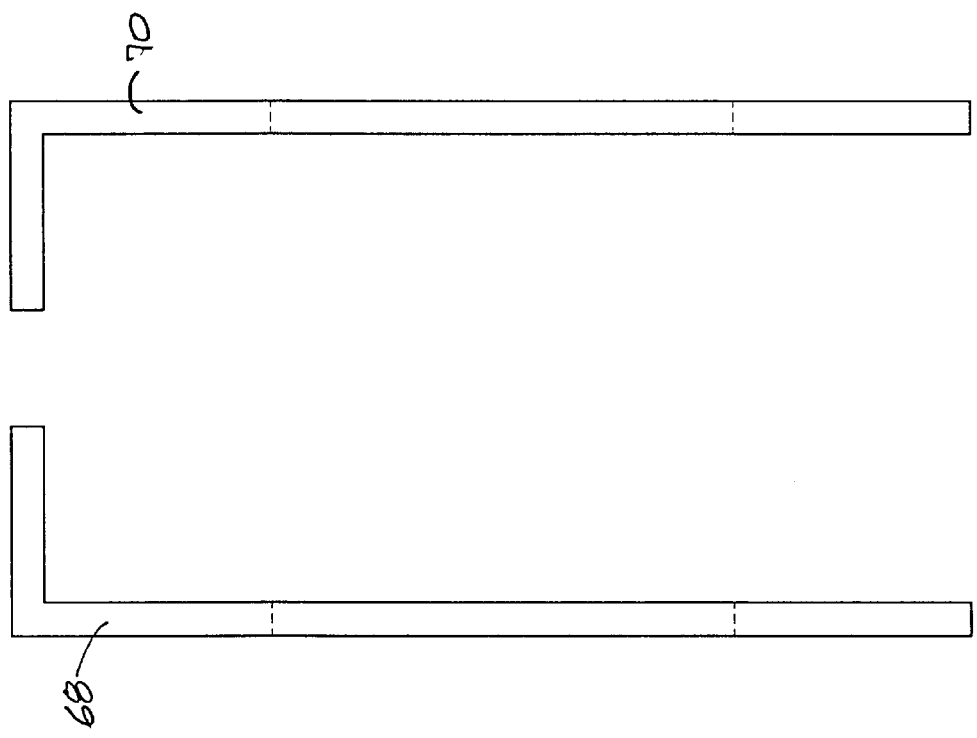
FIG. 10 is an elevational view of a pair of enclosure reinforcing strips.

The view of FIG. 10 illustrates a pair of enclosure reinforcing strips 68 and 70. Strips 68 and 70 are preferably formed from a rigid, plastic material such as, for example, lexan, and may be covered with a fabric material. According to a preferred embodiment for the invention, two pairs of strips 68 and 70 are provided, and the strips are attached by any suitable means to respective front and back edges of first embodiment 30 to provide rigidity to the unfolded, assembled enclosure 30. For example, hook and loop fasteners are an acceptable means for attaching the strips 68 and 70 to the respective front and back edges of panels 38, 40, 42, 44, and 46. The dotted lines in the view of FIG. 10 illustrate fold points for strips 68 and 70.

Referring once again to the view of FIG. 1, this embodiment of foldable enclosure 30 further comprises at least one base strap 72 attached to the distal end of side panel 40 and side panel 44. A corresponding base buckle 74 is attached to each of the base sides 50 and 52 in receiving relation to base strap 72, whereby the unfolded panels 38, 40, 42, 44 and 46 may be secured to base 48. Though not visible in the view of FIG. 1, corresponding straps 72 and buckle 74 would also be provided on the opposite side of first embodiment 30. It is also to be understood that corresponding straps 72 and buckles 74 are preferably used in all embodiments of the improved foldable enclosure of this invention.

A second preferred embodiment, generally indicated as 30A, is shown in the views of FIGS. 11, 12, 13, and 14. Similar structural elements have been designated in second embodiment 30A with identical reference numerals: however, the segment of flexible material extending between side panel 38 and top panel 46 is now designated as 66A, and the hinge between side panel 42 and top panel 46 is now indicated as 64A. The letter A has been added to these elements because of the slight difference in their placement in this second preferred embodiment 30A.

Referring now to the views of FIGS. 15A, 16A, 17 and 18, a third preferred embodiment is generally indicated as 30B. As above, similar structural elements have been identified with the same reference numeral. However differences with regard to this third preferred embodiment 30B have been indicated by the addition of a letter "B" to the reference numeral. For example, one can see that top panel 46 of first preferred embodiment 30 now comprises a pair of top panels 46B including a top panel fold line 76 joining the two halves 46B.

Figure 19:
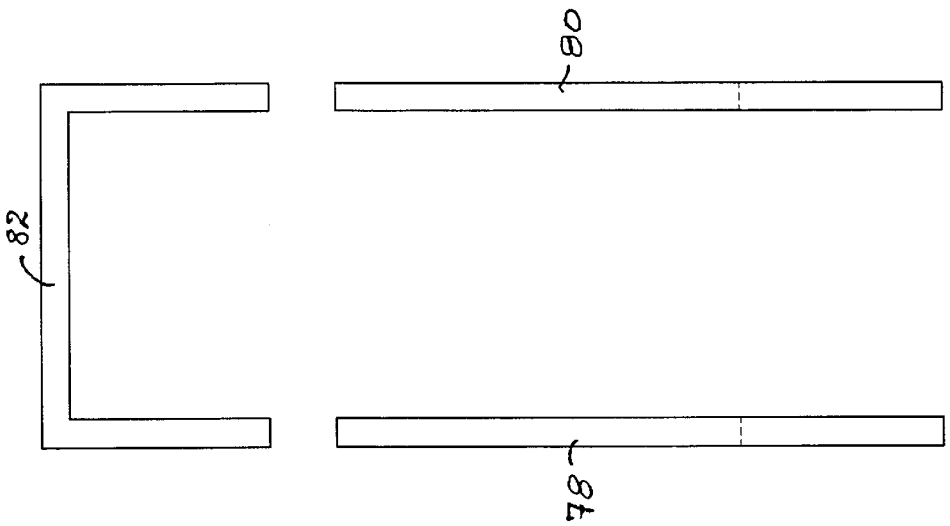
FIG. 19 is an elevational view of a second embodiment for the enclosure reinforcing strips.
Figure 17:
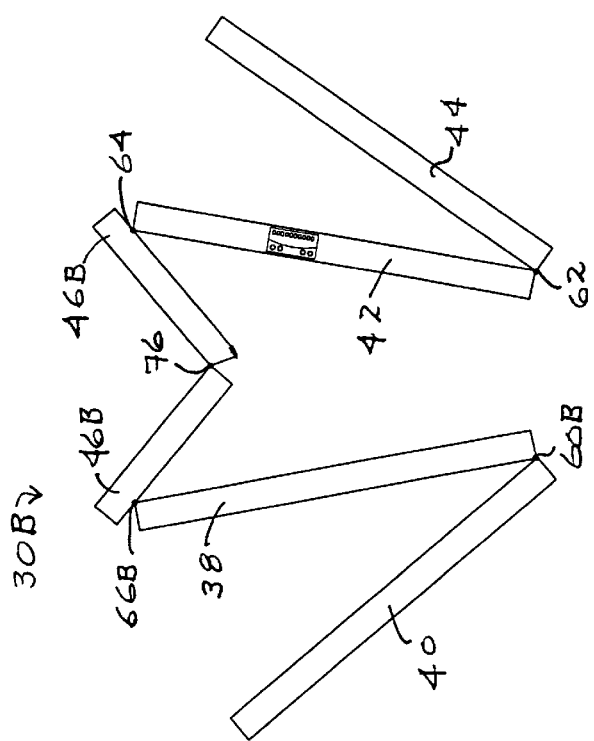
FIG. 17 is a further folded view of the embodiment of FIG. 15A.
Figure 18:
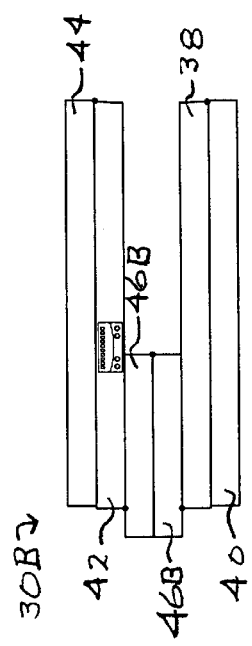
FIG. 18 is a completely folded view of the embodiment of FIG. 15A.

The view of FIG. 19 illustrates a second embodiment for the reinforcing strips particularly suitable for use in combination with third preferred embodiment 30B. A pair of side strips 78 and 80 are provided, and a substantially U-shaped top reinforcing strip 82 is including for the purpose of spanning top panels 46B. As above, the dotted lines shown in the view of FIG. 19 indicate where side strip 78 and 80 may be folded onto themselves. The construction and placement of strips 78, 80 and 82 are substantially as described above with regard to reinforcing strips 68 and 70.

Figure 16B:
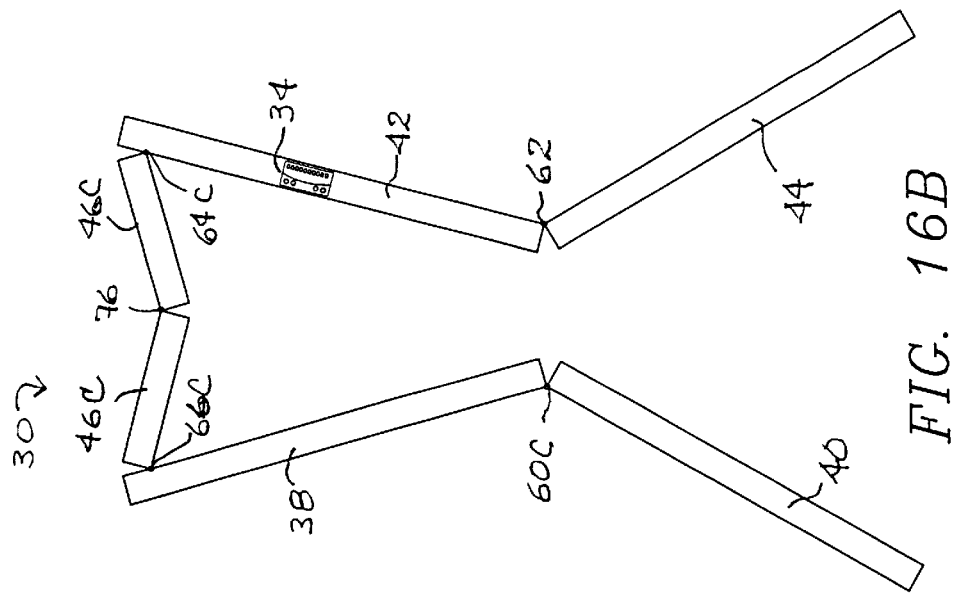
FIG. 16B is a partially folded view of the embodiment of FIG. 15B.
Figure 15B:
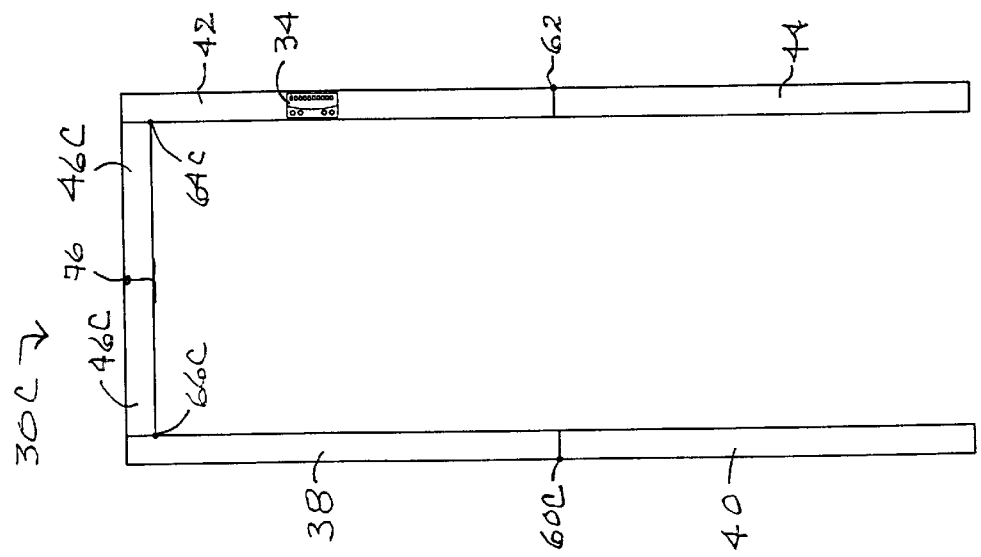
FIG. 15B is a fourth embodiment of the improvement of this invention.

The views of FIG. 15B and 16B illustrate a fourth embodiment for the foldable enclosure of this invention, generally indicated as 30C. One can see that the foldable enclosure 30C is substantially similar to third preferred embodiment 30B, with the sole exception being the placement of fold lines 64C and 66B.

Figures 20, 21:
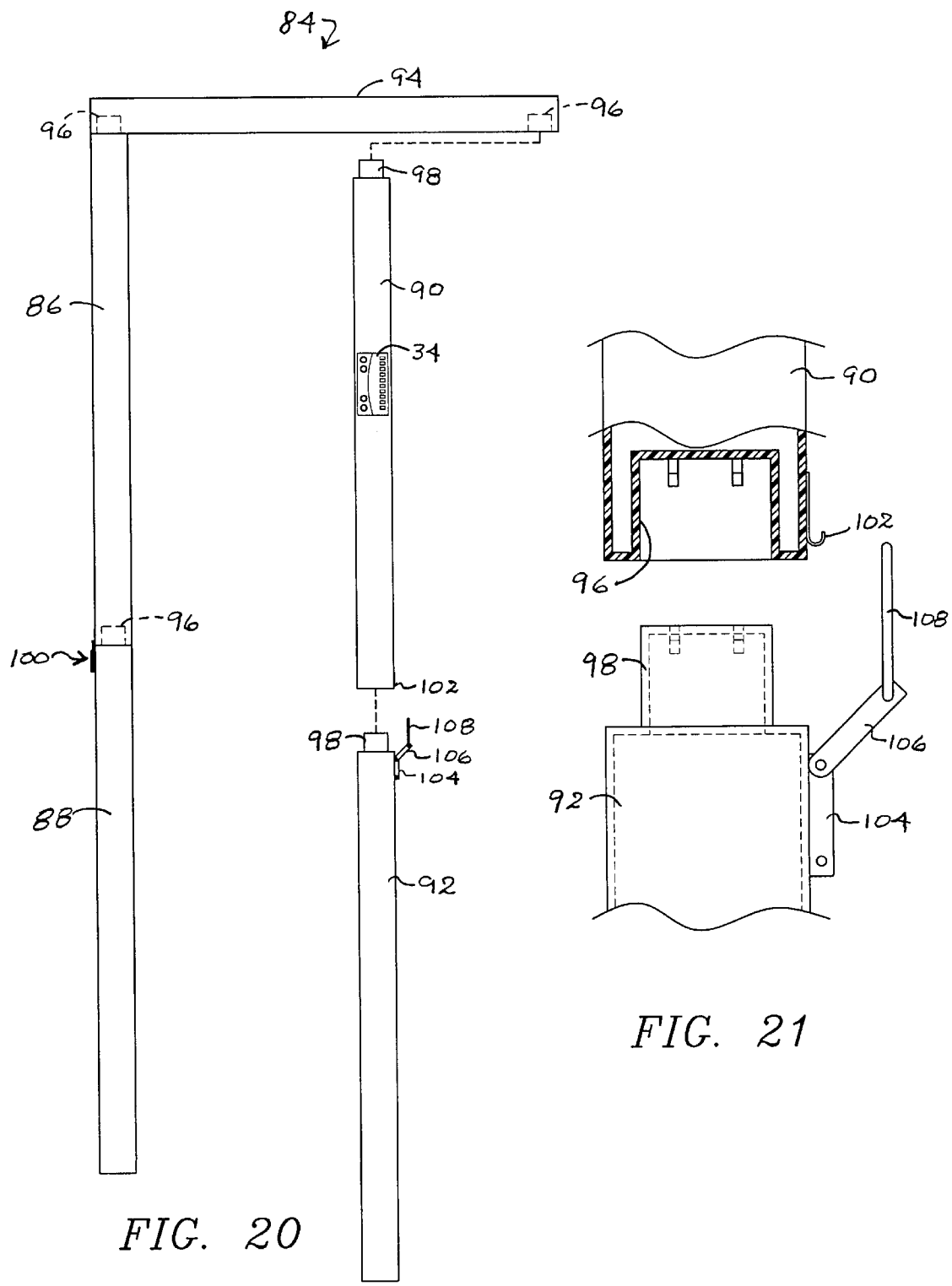
FIG. 20 is an exploded elevational view of a fifth embodiment of the improvement of this invention.
FIG. 21 is a detail view of the connecting means for the embodiment shown in the view of FIG. 20.

With particular regard to the four preferred embodiments thus far described, 30, 30A, 30B and 30C, the panels of those embodiments are preferably covered with a fabric material. Attention is now invited to the views of FIGS. 20 and 21 wherein a fourth embodiment, generally indicated as 84 is illustrated. In this embodiment, the panels are preferably covered with a hard material such that for preferred embodiment 84 is substantially rigid, but still foldable by disassembly. Though not shown in the view FIG. 20, it is to be understood that fourth embodiment 84 would be assembled in combination with a base substantially identical to base 48 described above. Furthermore, attachment of fourth embodiment 84 to its base 48 would employ corresponding base straps 72 and base buckles 74.

Fourth embodiment 84 of the foldable enclosure comprises side panels 86, 88, 90 and 92 and a top panel 94. Top panel 94 includes female receptacles 96 formed therein in engaging relation to corresponding male plugs provided on side panels 86 and 90. The opposed edges of side panels 86 and 90 include female receptacles 96 formed therein in receiving relation to corresponding male plug 98 formed on side panels 88 and 92. Electrical connections for the circuitry of the metal detector may be made through the interconnection of female receptacles 96 with male plugs 98. Exemplary details of this structure are shown in the fragmentary view of FIG. 21.

For the purpose of securing the connection between side panels 86 and 88 and 90 and 92, fourth preferred embodiment 84 further comprises drawbolt latches, generally indicated as 100. It is to be understood that similar drawbolt latches could also be used at the joints between side panels 86 and 90 with top panel 94. Turning to the detailed view of FIG. 21, an exemplar construction for drawbolt latch 100 is illustrated. A female hook 102 is provided at the end of side panel 90 substantially adjacent female receptacle 96. A male latch 104 is mounted on side panel 92 substantially male plug 98. Male latch 104 further comprises a moveable draw member 106 having a latch 108 attached thereto in engaging relation to female hook 102. Such drawbolt latches 100 are well known in a variety of structural configurations, and this drawbolt latch 100 is intended to be exemplar of such matches. Thus, it is to be understood that drawbolt latches 100 are provided to enhance the stability of an assembled boltable enclosure 84.

It is also to be understood that this fourth embodiment 84 of the foldable enclosure, when disassemble/folded, could also be placed within a suitable carrying case 32. It is also to be understood that while carrying case 32 is shown in the view of FIG. 2 as being formed from a fabric material, a hardshell carrying case is intended to be within the scope of the present invention.

It will thus be seen that the objects set forth above, among those made apparent from the preceding description, are efficiently attained, and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,
What is claimed is:

1. In a metal detector of the type where persons and objects pass through a magnetic field created by circuitry in the detector whereby the presence of metal may be determined, the improvement comprising a foldable enclosure for the detector's circuitry, said foldable enclosure comprising: a plurality of detector panels; means for connecting each one of said plurality of panels to at least one other of said plurality of panels, whereby said foldable enclosure may be erected to define a substantially inverted U-shaped configuration having a closed top, opposing legs of said U each having a distal end extending downwardly from said top, and an open bottom defined by the space between said distal ends; and a base dimensioned and configured to receive said distal ends, whereby the metal detector may be erected in an operative position.

2. A foldable enclosure as in claim 1 wherein each of said plurality of panels is covered with a fabric material and said means for connecting comprise a fabric segment.

3. A foldable enclosure as in claim 2 further comprising at least a pair of enclosure reinforcing strips, each one of said pair being removably attachable to a plurality of said panels.

4. A foldable enclosure as in claim 3 wherein said base is defined by a substantially H-shaped element, each side of said H-shaped element being dimensioned and configured to receive a corresponding one of said distal ends thereon with the cross bar of said H-shaped element extending there between.

5. A foldable enclosure as in claim 4 further comprising at least one base strap attached to and extending from each of said distal ends and each said side of said base comprising at least one base buckle attached thereto in receiving relation to a corresponding said base strap, whereby said base strap may be received and held by said base buckle.

6. A foldable enclosure as in claim 5 further comprising a carrying case dimensioned and configured to receive said improved metal detector therein in its folded state.

7. A foldable enclosure as in claim 1 wherein each of said plurality of panels is covered with a rigid material and said means for connecting comprise a plurality of mating male plugs and female receptacles, a corresponding one of each of said plugs and receptacles being disposed in engaging relation to the other on adjacent ones of said plurality of panels, whereby each one of said plurality of panels may be connected to at least one other of said plurality of panels.

8. A foldable enclosure as in claim 7 wherein said means for connecting further comprise a plurality of drawbolt latches, each of said latches including mating male and female parts, at least one of said male parts and at least a corresponding one of said female parts being operatively disposed on an adjacent pair of said plurality of panels, whereby each one of said plurality of drawbolt latches maybe engaged after said plurality of mating male plugs and female receptacles have been connected.

9. A foldable enclosure as in claim 8 wherein said base is defined by a substantially H-shaped element, each side of said H-shaped element being dimensioned and configured to receive a corresponding one of said distal ends thereon with the cross bar of said H-shaped element extending there between.

10. A foldable enclosure as in claim 9 further comprising at least one base strap attached to and extending from each of said distal ends and each said side of said base comprising at least one base buckle attached thereto in receiving relation to a corresponding said base strap, whereby said base strap may be received and held by said base buckle.

11. A foldable enclosure as in claim 10 further comprising a carrying case dimensioned and configured to receive said improved metal detector therein in its folded state.

* * * * *